United States Patent
Den Boer et al.

(10) Patent No.: US 8,621,922 B2
(45) Date of Patent: Jan. 7, 2014

(54) METHOD AND SYSTEM FOR MONITORING WATERBOTTOM SUBSIDENCE

(75) Inventors: Johannis Josephus Den Boer, Rijswijk (NL); Andre Franzen, Rijswijk (NL); Daniel Joinson, Rijswijk (NL); Kari-Mikko Jääskeläinen, Houston, TX (US)

(73) Assignee: Shell Oil Company, Houston, TX (US)

( * ) Notice: Subject to any disclaimer, the term of this patent is extended or adjusted under 35 U.S.C. 154(b) by 340 days.

(21) Appl. No.: 13/121,196

(22) PCT Filed: Sep. 29, 2009

(86) PCT No.: PCT/EP2009/062572
§ 371 (c)(1),
(2), (4) Date: Mar. 28, 2011

(87) PCT Pub. No.: WO2010/037726
PCT Pub. Date: Apr. 8, 2010

(65) Prior Publication Data
US 2011/0174497 A1    Jul. 21, 2011

(30) Foreign Application Priority Data
Sep. 30, 2008   (EP) .................................... 08165487

(51) Int. Cl.
*G01D 3/00*   (2006.01)
(52) U.S. Cl.
USPC ..................................... 73/170.29; 73/170.32
(58) Field of Classification Search
USPC ......................................... 73/170.29–170.34
See application file for complete search history.

(56) References Cited

U.S. PATENT DOCUMENTS

| | | | | |
|---|---|---|---|---|
| 3,820,391 A * | 6/1974 | Baker et al. | ................. | 73/170.29 |
| 3,996,794 A * | 12/1976 | Helgans, Jr. | ................. | 73/170.29 |
| 4,145,817 A | 3/1979 | Ager | ................................ | 33/367 |
| 5,691,957 A * | 11/1997 | Spiesberger | ...................... | 367/3 |
| 7,308,821 B1 * | 12/2007 | Pohlmann | ........................ | 73/84 |
| 2010/0005857 A1 * | 1/2010 | Zhang et al. | ................. | 73/29.02 |
| 2013/0025362 A1 * | 1/2013 | Sudow et al. | ............... | 73/170.33 |

FOREIGN PATENT DOCUMENTS

| | | | | |
|---|---|---|---|---|
| FR | 2661744 | 11/1991 | ............... | G01C 5/04 |
| FR | 2749473 | 12/1997 | ............... | G01H 9/00 |
| GB | 2224845 | 5/1990 | ............... | G01B 5/00 |
| JP | 60235012 | 11/1985 | ............... | G01C 5/04 |
| JP | 09196711 | 7/1997 | ............. | G01D 21/00 |
| WO | WO0142818 | 6/2001 | ............... | G01V 9/00 |
| WO | WO2005014976 | 2/2005 | ............... | E21B 47/12 |
| WO | WO2006048616 | 5/2006 | ............... | F16K 31/08 |

* cited by examiner

*Primary Examiner* — Andre Allen

(57) ABSTRACT

A system for monitoring subsidence and/or rising of a waterbottom has string of pressure sensors along the interior of a sealed -protective tube(q−) that rests on the waterbottom and is filled with a low pressure liquid, so that any subsidence and/or rising of the can be deduced from subsidence and/or rising of a section of the tube and associated pressure variations measured by the sensors due to variation of the hydrostatic fluid pressure of the liquid in the of the tube. The tube interior is divided into segments by valves during descent to protect the sensors against hydrostatic pressure of the liquid within the tube during installation. The use of a low pressure liquid in the tube allows the use of sensitive pressure sensors which are able to monitor pressure variations of −0.001 Bar associated with a waterbottom subsidence of −1 cm, at a water depth of >km where the ambient water pressure may be >100 Bar.

7 Claims, 2 Drawing Sheets

METHOD AND SYSTEM FOR MONITORING WATERBOTTOM SUBSIDENCE

PRIORITY CLAIM

The present application claims priority from PCT/EP2009/062572, filed 29 Sep. 2009, which claims priority from European Application EP 08165487.3, filed 30 Sep. 2008.

TECHNICAL FIELD OF THE INVENTION

The invention relates to a method and system for monitoring subsidence and/or rising of a waterbottom, such as an ocean floor, sea- or riverbed and/or the bottom of a lake.

BACKGROUND OF THE INVENTION

It is often desirable to accurately monitor subsidence and/or rising of a waterbottom for example in an area with tectonic activity and/or where crude oil and/or natural gas is produced from an underwater oil and/or natural gas containing formation.

In such case it is desirable to measure subsidence and/or rising of a large area of the waterbottom with high resolution and accuracy in the order of centimeters, or better. It would be possible to install an array of pressure sensors, which measure the ambient water pressure at the waterbottom to monitor subsidence and/or rising thereof.

However, tidal variations of waterdepth, variations of atmospheric pressure, waves and currents will generate significant variations of the measured pressure and if the pressure sensors are installed in a deepwater area, for example at a waterdepth of several kilometers the pressure sensors must be capable of withstanding pressure variations of several hundreds of Bar, whereas they must measure pressure variations with an accuracy in the order of 0.001 Bar in order to monitor a vertical waterbottom movement in the order of one centimeter.

It is known from French patent 2661744 to measure seabed subsidence with a series of pressure sensors arranged in a pressure resistant tube which is filled with a low pressure fluid. Other subsidence monitoring systems are known from Japanese patent 60235012, French patent 2749473, U.S. Pat. No. 4,145,817, UK patent 2224845, International patent application WO01/42818.

A problem with the system known from French patent 2661744 is that during installation the hydrostatic pressure of the fluid within the tube may damage the highly sensitive pressure sensors.

It is an object of the present invention to provide a method and system for monitoring subsidence and/or rising of a waterbottom using adequately protected pressure sensors that are able to monitor any vertical waterbottom movements with an accuracy in the order of centimeters even at large waterdepth of up to several kilometers and/or in an area with significant currents, tidal depth variations and/or wave impact, and wherein the tube can be installed at a significant waterdepth without the risk of damage to the pressure sensors due to the hydrostatic pressure of the fluid within the tube.

SUMMARY OF THE INVENTION

In accordance with the invention there is provided a method of monitoring subsidence and/or rising of a waterbottom, the method comprising:
arranging a plurality of pressure sensors in the interior and at different points along the length of a sealed pressure resistant protective tube, which tube is filled with a fluid and provided with valves which are configured to divide the interior of the sealed pressure resistant protective tube into a series of sealed longitudinally spaced segments;
lowering the tube onto the waterbottom while the valves are closed and divide the interior of the tube into a series of longitudinally spaced segments;
opening the valves after installation of the tube on the waterbottom while the fluid pressure in the interior the tube is substantially lower than the hydrostatic pressure of the water surrounding the tube; and
deducing any subsidence and/or rising of the waterbottom from any variation of the fluid pressures measured by the pressure sensors at different moments in time.

The sealed pressure resistant protective tube may be filled with a liquid having a pressure between 0.1 and 10 Bar and may be arranged at the bottom of an ocean, sea, lake, or river having a depth between 10 and 10.000 meter.

The pressure sensors may be configured to measure a pressure difference of less than 0.001 bar.

The pressure resistant tube may be at least partly, or fully, filled with an aqueous liquid having a density of between 0.5 and 1.5 kg/cm$^3$ and the sensors are connected to a waterbottom subsidence monitoring system, which is configured to determine subsidence and/or rise of the waterbottom of less than 1 cm. The waterbottom subsidence monitoring system according to the invention may be used in a region where hydrocarbon fluid is produced from an underwater hydrocarbon fluid containing formation to measure waterbottom subsidence and/or rising associated with the production of hydrocarbon fluids from the formation and/or injection of water and/or other fluids into the formation.

Accordingly, in accordance with another aspect of the invention there is provided a method of producing hydrocarbon fluid from an underwater hydrocarbon fluid containing formation, wherein subsidence and/or rising of the waterbottom associated with the production of hydrocarbon fluids from the formation and/or injection of water and/or other fluids into the formation is monitored by the system and method according to the invention.

In the method and system according to the invention the use of a pressure resistant tube which is preferably filled with a low pressure liquid, such as water, allows the use of sensitive pressure sensors which are able to monitor pressure variations in the order of 0.001 Bar, which may be associated with a waterbottom subsidence in the order of 1 cm, at a waterdepth of several kilometers where the ambient water pressure near the waterbottom may be several hundred Bar.

These and other features, embodiments and advantages of the method and system according to the invention are described in the claims, abstract and the following detailed description of a preferred embodiment in which reference is made to the accompanying drawings.

DETAILED DESCRIPTION OF DEPICTED EMBODIMENTS

Figure 1:
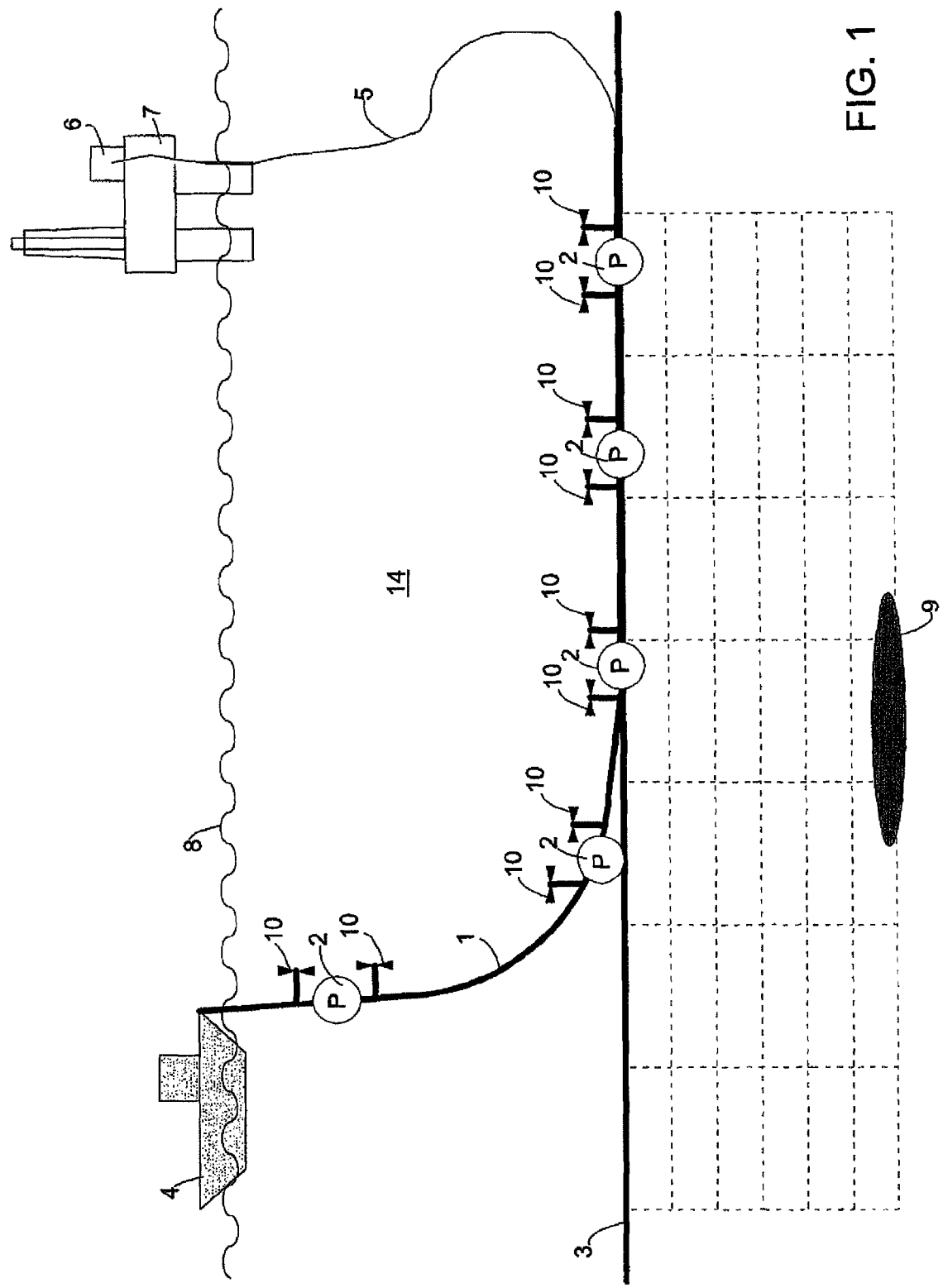
FIG. 1 shows how a sealed protective tube comprising a series of pressure sensors is lowered from a ship onto the waterbottom.

Referring to FIG. 1 there is shown a sealed pressure resistant protective tube 1 comprising a series of longitudinally spaced pressure sensors 2, which tube 1 is being lowered through a body of water 14, such as an ocean, sea, lake or river with a depth of several hundreds of meters or kilometers, to the waterbottom 3 from a ship 4.

The pressure sensors 2 are configured to transmit the measured pressure via a pair of fiber optical, electrical or other signal transmission cables 26, 27 to a subsidence monitoring system 6 mounted on a ship or oil and/or gas production platform 7, which floats at the water surface 8 and is used to produce crude oil and/or natural gas from a subsea oil and/or gas reservoir 9. In order to protect the sensitive pressure sensors 2 against pressure variations during installation due to the hydrostatic pressure of the fluid in the interior of the protective tube 1 a series of valves 10 is arranged in the tube adjacent to the pressure sensors 2, which valves 10 are closed during the descent and installation of the tube 1 onto the waterbottom 3 and which are opened after the tube lies on the waterbottom 3.

Figure 2:
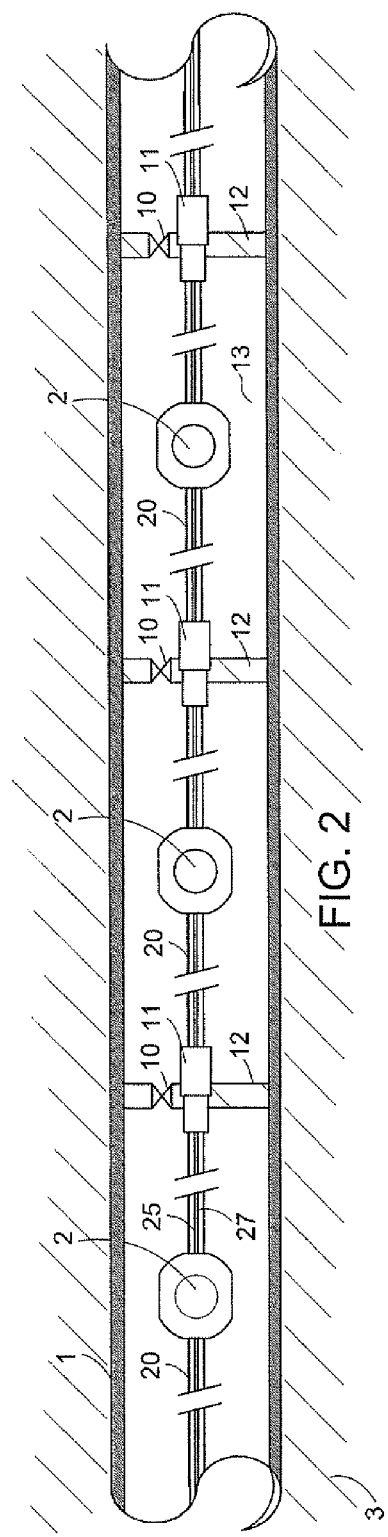
FIG. 2 is a longitudinal sectional view of the protective tube and a series of pressure sensors lying on the waterbottom.

FIG. 2 depicts a longitudinal sectional view of the protective tube 1 lying on the water bottom 3. A string of pressure sensors 2 is connected to a single optical cable 5 whereby the individual pressure sensors 2 are connected to each other or to the fibre optic cable 5 by means of optical connectors 11 which are placed in a protective pipe 20. This modular approach allows flexibility in making up the sensing system and will assist transportation, deployment and sensor/spares inventory management. The protective tube 1 comprises a series of bulkheads 12 in which the valves 10 are arranged, which valves 10 are opened once the protective tube 1 fully lies on the waterbottom 3.

The valves 10 may be electromagnetic valves 10 which consume a low amount of energy when they are opened and/or closed, such as valves described in Camcon's International patent application WO2006048616. These electromagnetic valves may be actuated by a optical signals transmitted through a fiber optical cable, which signals are converted into electric signals for opening and/or closing the valves 10 by opto-electrical converters located near the valves which convert the optical signals into electrical signals which actuate and power the valves 10. When the valves 10 are opened the interior 13 of the protective tube 1 forms a continuous fluid channel, which is filled with a low pressure liquid, such as water, of which the pressure is maintained between 0.1 and 10 Bar by a pump (not shown), so that the pressure sensors 2 monitor hydrostatic pressure differences in the low pressure liquid, which has a much lower pressure than the body of water 14 surrounding the tube, allows the use of sensitive pressure sensors 2 that are able to monitor pressure variations of less than about 0.001 Bar, which corresponds to the pressure of a watercolumn of about 1 cm, so that subsidence of less than 1 cm of any section of the protective tube 1 can be measured, even if the protective tube lies on the bottom 3 of a body of water 14, such as an ocean, with a waterdepth of several kilometres, where the water pressure near the waterbottom is several hundred Bar.

Figure 3:
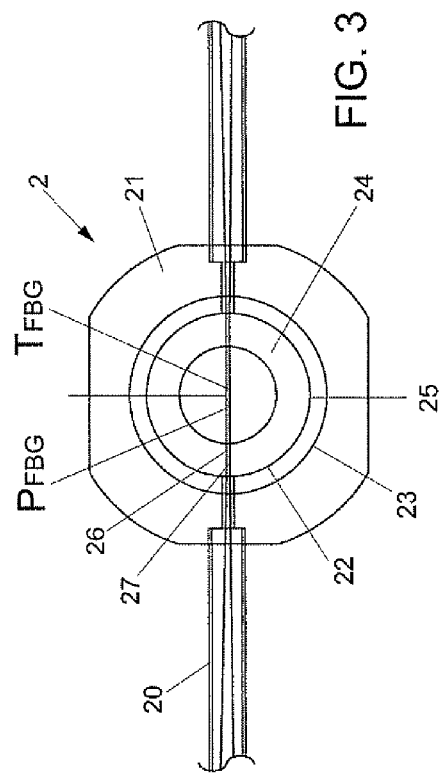
FIG. 3 is a top view of a pressure sensor shown in FIG. 2 shown at an enlarged scale.
Figure 4:
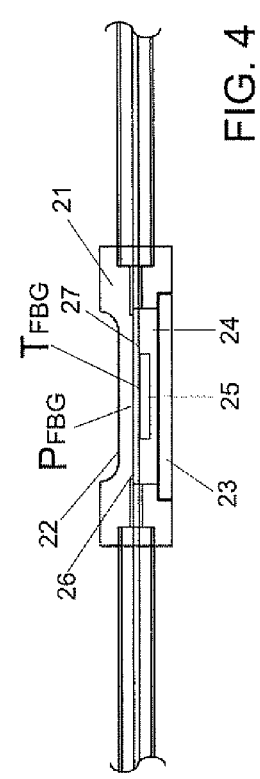
FIG. 4 is a longitudinal sectional view of the pressure sensor shown in FIG. 3.

FIGS. 3 and 4 depict a fibre optic sensor 2 according to the invention comprising a housing 21, which is also referred to as the pressure cell 21. The upper wall of the housing 21 defines a diaphragm 22. The housing comprises a bottom cap 23, which is sealed and secured in a recess at the bottom of the housing 21 and in the interior 24 of the housing a coupon is arranged, which defines a strain-decoupled mechanism 25.

The geometry of the sensor diaphragm 22 is defined as a thick plate membrane, with a flat surface on both sides, having an aspect ratio a/b close to 1, where a and b are the inside length and width of the diaphragm.

The diaphragm 22 is responsive to an external force such as pressure and also temperature, while the strain-decoupled mechanism 25 is responsive only to temperature by way of thermal expansion, not affected by an external force or pressure.

The diaphragm 22 and the strain-decoupled mechanism 25 are preferably made out of the same type materials or materials that have nominally the same mechanical properties, and in particular thermal expansion, which will enhance the temperature compensation of the pressure measurement.

In the embodiment shown in FIG. 2-4 a plurality of optical fibres 26,27 extend through the interior 24 of the sensor housing 21. The first optical fibre 26 is bonded to the diaphragm 22. The second optical fibre 27 is bonded to the strain-decoupled mechanism 25, e.g. a dedicated coupon or the inner sidewall of the sensor housing 21. The optical fibres 26 and 27 are bonded to the host specimen, i.e. the diaphragm 22 and the coupon 25 or inner side wall, by means of a suitable adhesive such as epoxy resin, polyimide adhesive, silica-filled epoxy compound, an organically modified ceramic, glass solder, ceramic cement or sprayed alumina, or electrodeposited or sputtered metal (for high temperature) etc. to ensure that, over the full operating range of the optical sensor, e.g. from −20 to 800 degrees Celsius, the optical fibres 26 an 27 will stay in intimate contact with the host specimen 22 and 25 and that the strains in the host specimen 22 and 25 are transferred directly to the optical fibres attached to them with minimal long-term creep.

The first and the second optical fibres 26 and 27 each contain at least one Fibre Bragg Grating (FBG). The Fibre Bragg Grating (FBG) has a refractive index variation that provides maximum reflectivity at a central wavelength, which will shift due to induced strain in the fibre e.g. by pulling, pushing or bending the optical fibre. The reflectivity of an FBG wavelength depends on the overall length of the grating, the periodicity of the grating, the 'normal' refractive index of the core and the modulated refractive index.

The pressure sensing FBG $P_{FBG}$ in the first optical fibre 26 is fixed to the diaphragm 22 at a predetermined location near the centre of the diaphragm 22 where the strain, caused by the deflection of the diaphragm 22, resulting from an external force or pressure at the outside of the sensor housing 21, is maximal and symmetrically distributed, and the mechanical behaviour of the diaphragm 22 is predictable and repeatable.

The temperature sensing FBG $T_{FBG}$ in the second optical fibre 27 is fixed to the strain-decoupled mechanism 25 (e.g. a coupon or inner side wall) at a predetermined location unaffected by induced mechanical strain due to an external force or pressure outside of the sensor housing 21 including the diaphragm 22. This ensures that the strain on the temperature sensing FBG $T_{FBG}$ in the second optical fibre 27 is solely related to the thermal expansion of the host specimen, i.e. the coupon 25 or inner side wall. The measured strain is a temperature compensation means for the pressure grating $P_{FBG}$ in the first optical fibre 26.

The strain-decoupled mechanism 25 (e.g. a coupon or the inner surface of the sensor housing) will mechanically protect the optical fibre 27 going through the sensor housing, in particular against shock and vibration, and importantly avoid the effects of shock and vibration being measured by the temperature sensing FBG, as might be the case if the temperature sensing was located in loose fibre.

The wavelength of an FBG has an intrinsic temperature sensitivity related to the thermo-optic coefficient of the optical fibre 26,27. The pressure and temperature sensing FBGs $P_{FBG}$ and $T_{FBG}$ are of identical manufacture and have thermo-optic coefficients that are nominally the same or at least similar to avoid common drift problems.

Another aspect of the invention is a means to increase the pressure resolution of the pressure cell 2, and/or to adjust the measurement range by pressurizing the inside of the sensor housing 21 with a suitable fluid.

For instance, the pressure resolution of a standard pressure cell can be increased or decreased by pressurizing the inside of the sensor housing at a pressure equal to one half of the maximum operating pressure of the cell. In this configuration, the pressure cell is pressurized with a pressure equal to the expected minimum-point of the sensor operation. Then, a very sensitive diaphragm 22 is used in order to measure variations between the reference minimum-point pressure and the upper and lower working pressures of the medium in contact. For instance, if the sensor is required to operate between 90 and 110 m $H_2O$, then the reference pressure is set at 90 m $H_2O$, and a diaphragm 2 with a 20 m $H_2O$ range is used. Equally, if the pressure sensor 2 is required to operate between 990 and 1010 m $H_2O$, then the reference pressure is set at 990 m $H_2O$, and a diaphragm 22 with a 20 m $H_2O$ range is used.

Another aspect of the invention is a means to prevent the diaphragm displacement exceeding a preset figure. In order to avoid yielding the diaphragm 22 whilst the sensor is in an environment above or below its working pressure range, a mechanical stop is introduced at one or either side of diaphragm to prevent overloading and permanent deformation of the diaphragm 22.

Another aspect of the invention is a means to prevent or minimize oxidation and/or chemical reactions with undesirable effects by using an inert gas or other suitable material in the interior 24 of the sensor housing 21.

It is also preferred to use nominally matching wavelengths for the pressure and the temperature FBG $P_{FBG}$ and $T_{FBG}$. This enables to further optimise the temperature-compensating scheme, since the pressure and temperature FBGs can be written at nominally the same wavelength in the optical fibres 26,27. Experimental data shows that using nominally the same wavelength for both pressure and the temperature FBG can eliminate the effect of common-mode drift in the FBG interrogator on the final pressure result.

Either a Wavelength Division Multiplexing (WDM) or a Time Division Multiplexing (TDM) interrogation scheme can be used in the method and sensor assembly according to the invention.

In a WDM interrogation scheme a plurality of pressure and temperature sensors PFBG and $T_{FBG}$ may be multiplexed on two fibres 26 and 27, each sensor having two FBG of nominally matched wavelengths, which can be the same as other cells.

The embodiment shown in FIG. 2-4 with two fibres 26 and 27 lends itself well to use in a 2-channel WDM system where the channels share the same wavelength discriminating means.

The Wavelength Division Multiplexing (WDM) interrogation scheme as well as the TDM scheme would also work on a single fibre that passes through the sensor string in one direction and back through the sensor string in another direction after passing round a u-bend so long as the FBGs are selected so as not to overlap in wavelength during the operation of the sensor. An aspect of the invention is an optimized WDM interrogation scheme wherein the expected wavelength shift during the operation of the sensor is accounted for. For example, at a pressure lower than the operating pressure the grating spectra will overlap but at the operating pressure range, the FBGs will have moved apart sufficiently for them to be differentiated by wavelength. This optimized WDM interrogation scheme allows for FBGs to be closer in wavelength and so permit more FBGs to be measured on a single fibre. If a Time Division Multiplexing (TDM) measurement system is used then it is preferred to use a plurality of sensors that are multiplexed on one—when a mini-bend or turnaround is used—or two fibres 26 and 27, with each sensor having two FBG and all FBGs of nominally matched wavelengths.

In the pressure sensor assembly according to the invention alternating P and T FBGs may be used on the sensing fibres 26, 27 for redundancy in case measurement data from one fibre 26,27 is completely lost, in which case P & T information will still be collected, albeit at half the spatial resolution and less measurement certainty.

In the pressure sensor assembly according to the invention pairs of optical fibres 26, 27, for example the first and second optical fibre 26,27, may be interconnected by using a minibend or another means of optical splicing or fibre turnaround, to create a double-ended optical fibre 26,27, which will allow the FBGs to be interrogated from both ends of the optical fibre, providing redundancy and improved reliability to the sensing system. A suitable minibend is disclosed in International patent application WO2005/014976.

In the sensor assembly according to the invention a plurality of optical fibres 26,27 may extend through the interior 24 of the sensor housing 21 for single or double-ended distributed sensing of e.g. temperature or strain utilising Rayleigh, Raman or Brillouin scattering, etc. in combination with one or more pressure cells in a single optical cable 26, 27.

The array of optical sensors may be connected to one or more suitable fibre optic interrogation and readout systems. Or several arrays may be connected to one fibre optic interrogation and readout unit using a suitable optical switch.

Some of the improvements and advances of various preferred aspects of the method and pressure sensor assembly over the assemblies known from the cited prior art references are summarized below.

It is preferred to use in the sensor assembly according to the invention a sensor housing 21 comprising a tube or a box with a thick plate membrane having a flat surface on both sides, or a parallel faced diaphragm 22, with an aspect ratio close to one.

An advantage of an aspect ratio close to one over an aspect ratio other than close to one is that the area of maximum tensile strain is well defined and concentrated at the centred at the diaphragm 22, which makes the solution predictable and practical.

If the aspect ratio is larger the tensile strain is small and almost zero at the centre of the diaphragm 22 in the axis of the longer dimension, this being the axis where strain measurement would be most practical.

It is preferred that in the method according to the invention a pressure cell 2 is used, which is internally pressurized to increase the resolution and/or shift/adjust the measurement range.

It is also preferred to use in the method and sensor assembly according to the invention a pressure cell 2, which is filled with a suitable mix of fluids and/or other materials to allow high sensing sensitivity at elevated ambient pressures.

It is also preferred to use an inert gas or other suitable material inside the pressure sensor 2 to minimize oxidation and chemical reactions with undesirable effects.

It is furthermore preferred to use a hydrogen getter of a suitable material inside the pressure sensor 2 to absorb undesirable chemicals that may be harmful to the mechanical or optical performance of the pressure sensor 2.

It is furthermore preferred to provide the pressure sensors 2 with substantially rectangular housings 21 that are configured such that stress on the housing 21 due to pull and/or push forces exerted by the protective pipe 20 is inhibited and to allow calibration of the pressure sensors 2 in a mechanical clamp assembly instead of in a high pressure vessel.

Advantages of the use of strain-decoupling substrate, coupon or other mechanism 25 for the temperature grating involving bonding to a strain-isolated substrate over a free FBG measuring air temperature are that:
  the temperature sensitivity is significantly improved,
  the temperature FBG is given improved mechanical protection,
  the temperature FBG is wholly isolated from strains induced by external loads or vibrations of the sensor
  the same material or materials with similar Thermal Expansion can be used for the diaphragm 22 and the strain-decoupling mechanism 25.

Advantages of the use of the same material or materials with similar Thermal Expansion for the diaphragm 22 and the strain-decoupling mechanism 25 over using dissimilar materials are that:
  the rate and amount of temperature response of the two materials are identical,
  the interface between the fibre 26,27 and the substrate is identical in both sensors,
  it is possible to use nominally matched wavelengths for the pressure and temperature FBG.

Advantages of the use of nominally matched wavelengths for the pressure and temperature FBG over a using different wavelength FBGs are that:
  i) any wavelength measurement uncertainty of the instrumentation resulting in drifts common to all wavelengths is cancelled out. The only remaining source of wavelength measurement error that can compromise the accuracy of pressure measurements is a differential error, the effect of which is greatly reduced since the difference in wavelength between the pressure-sensing FBG and the temperature-sensing FBG is minimised.
  ii) the temperature sensitivity of the two FBGs (which varies with wavelength) are substantially the same at a given wavelength.

Use of the above features i and ii together allow more precise temperature compensation to be made by measuring the differential wavelength between the two FBGs in each sensor than is the case when the FBG wavelengths are not nominally matched.

It is preferred to place the pressure and temperature grating on separate optical fibres 26,27, bonded on the diaphragm 22 and a strain-decoupling mechanism 25 made out of the same type of material, with the temperature grating having nominally the same wavelength as the pressure grating, which enables providing a direct measurement of the temperature shift and thermal expansion of the diaphragm 22.

An advantage of the optional use of a double-ended sensing fibre over having the sensing fibres terminate at the end of the sensor string is that each array could be interrogated from both ends such that redundancy is added in the case of a fibre break or connector terminal degradation.

An advantage of the optional use of alternating P and T FBGs on the two sensing fibres 26,27 is that if connection to one fibre is completely lost P & T information still is available, albeit at half the spatial resolution and with less measurement certainty.

An advantage of the connection in accordance with a preferred aspect of the present invention of individual pressure sensors into a string using optical connectors (with the optical connectors either rated to well conditions or protected from well Pressure conditions with a protective housing) assists in deployment and sensor/spares inventory management.

It will be understood that any type of pressure sensors may be arranged in the protective tube and that any type of wired or wireless data transmission system may be used to transmit the pressure data generated by the pressure sensors to a seabed subsidence monitoring at surface.

What is claimed is:

1. A method of monitoring subsidence and/or rising of a waterbottom, the method comprising:
  arranging a plurality of pressure sensors in the interior and at different points along the length of a sealed pressure resistant protective tube, which tube is filled with a fluid and provided with valves which are configured to divide the interior of the sealed pressure resistant protective tube into a series of sealed longitudinally spaced segments;
  lowering the tube onto the waterbottom while the valves are closed and divide the interior of the tube into a series of longitudinally spaced segments;
  opening the valves after installation of the tube on the waterbottom while the fluid pressure in the interior the tube is substantially lower than the hydrostatic pressure of the water surrounding the tube; and
  deducing any subsidence and/or rising of the waterbottom from any variation of the fluid pressures measured by the pressure sensors at different moments in time.

2. The method of claim 1, wherein the sealed pressure resistant protective tube is filled with a liquid having a pressure between 0.1 and 10 Bar.

3. The method of claim 1, wherein the waterbottom is the bottom of an ocean, sea, lake, or river having a depth between 10 and 10,000 meter.

4. The method of claim 1 wherein the pressure sensors are configured to measure a pressure difference of less than 0.001 bar.

5. The method of claim 4, wherein the pressure resistant tube is at least partly filled with an aqueous liquid having a density of between 0.5 and 1.5 kg/cm3 and the sensors are connected to a waterbottom subsidence monitoring system which is configured to determine subsidence and/or rise of the waterbottom of less than 1 cm.

6. The method of claim 1 wherein the waterbottom subsidence monitoring system is used in a region where hydrocarbon fluid is produced from an underwater hydrocarbon fluid containing formation to measure waterbottom subsidence and/or rising associated with the production of hydrocarbon fluids from the formation and/or injection of water and/or other fluids into the formation.

7. A method of producing hydrocarbon fluid from an underwater hydrocarbon fluid containing formation, wherein subsidence and/or rising of the waterbottom associated with the production of hydrocarbon fluids from the formation and/or injection of water and/or other fluids into the formation is monitored by the method according to claim 1.

* * * * *